United States Patent Office 3,406,178
Patented Oct. 15, 1968

3,406,178
PREPARATION OF 2-SUBSTITUTED
BENZIMIDAZOLES
Henry Peter Crocker, North Balwyn, Victoria, and William George Clive Raper, Moorabbin, Victoria, Australia, assignors to Monsanto Chemicals (Australia) Limited, West Footscray, Victoria, Australia, a company of Victoria
No Drawing. Filed Jan. 29, 1965, Ser. No. 429,161
Claims priority, application Australia, Feb. 4, 1964, 40,453/64; Apr. 23, 1964, 43,606/64
8 Claims. (Cl. 260—309.2)

ABSTRACT OF THE DISCLOSURE

A process for producing biologically active 2-substituted benzimidazoles from o-nitroaniline or a nuclear-substituted derivative of o-nitroaniline and an aldehyde or a carboxylic acid or a precursor material which forms an aldehyde or a carboxylic acid by passing the reactants in vapor phase together with hydrogen over a catalyst bed of a member of the platinum family of metals. The 2-substituted benzimidazoles are active as anti-mycotic agents and as anthelmintics.

---

This invention relates to the production of 2-substituted benzimidazoles, which substances exhibit a range of useful biological activities and find uses inter alia as anti-mycotic agents and as anthelmintics.

2-substituted benzimidazoles are usually produced by synthesis from an o-phenylene diamine by reaction with (a) a carboxylic acid in the presence of a large volume of mineral acid, or by reaction with (b) an aldehyde in the presence of a mild oxidizing agent such as a copper salt, according to the following equations:

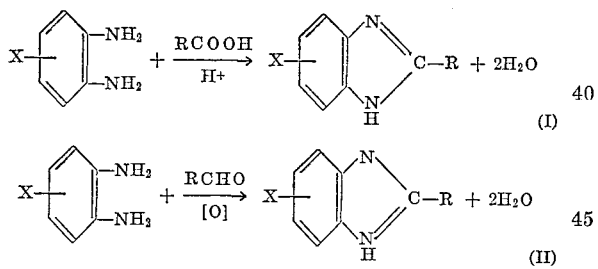

wherein X is hydrogen or a substituent or substituents and R is a group contributed by the selected carboxylic acid or aldehyde. Both reactions suffer from the disadvantage that they require batchwise, liquid-phase operation, and are expensive to operate on a large scale. Moreover, the o-phenylene diamine raw material is expensive and readily oxidized, and the benzimidazole product which may be obtained in high yield, is often contaminated with tar and difficult to purify. This results in a high cost of manufacture, which, in some cases, limits the use of the benzimidazole.

We have now found that 2-substituted benzimidazoles can be prepared simply and in good yield by reaction of an o-nitroaniline (o-nitroaniline itself or a nuclear-substituted derivative) with an aldehyde or a carboxylic acid or a precursor of either of these materials, under conditions of catalytic hydrogenation, in which the hydrogenation catalyst is a member of the platinum family of metals on a suitable catalyst support. We have found that in this way, 2-substituted benzimidazoles can be prepared by an economical, continuous operation, and in a high state of purity, from readily available raw materials.

Thus, in accordance with the present invention, there is provided the process of producing 2-substituted benzimidazoles which comprises the vapor phase reaction of o-nitroaniline or a nuclear-substituted derivative of o-nitroaniline, with an aldehyde or a carboxylic acid or a precursor material which forms an aldehyde or a carboxylic acid, under the conditions of the reaction, by passing said reactants in vapor or gaseous phase, together with hydrogen, over a catalyst bed of a member of the platinum family of metals on a suitable catalyst support, and recovering the 2-substituted benzimidazole reaction product. The reaction according to the process of the invention employing an aldehyde reactant, may be expressed as shown in the following equation:

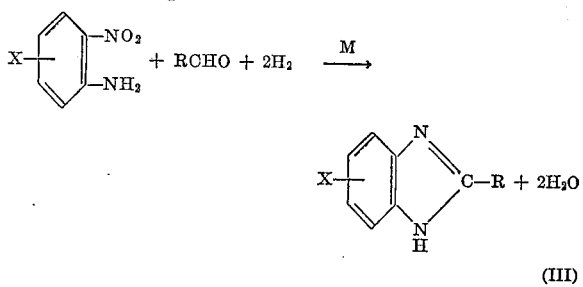

wherein X is hydrogen or a substituent group or groups, the substituent group or groups conveniently being selected from halogen or alkyl or alkoxy, preferably in which the alkyl or alkyl portion of the alkoxy group contains from one to four carbon atoms; R is a group contributed by the particular aldehyde employed; and M is the metal catalyst selected from ruthenium, rhodium, palladium, osmium, iridium, and platinum, and hereinafter referred to as metals of the platinum family. Likewise, the reaction according to the process of the invention, employing a carboxylic acid reactant, may be expressed as shown in the following equation:

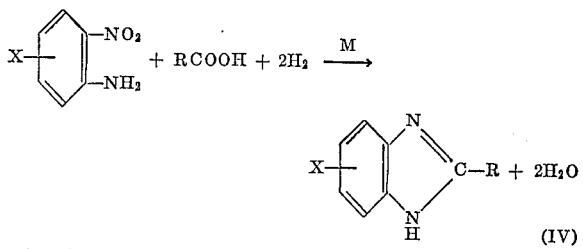

wherein X is hydrogen or a substituent group or groups, the substituent group or groups conveniently being selected from halogen or alkyl or alkoxy, preferably in which the alkyl or alkyl portion of the alkoxy group contains from one to four carbon atoms; R is a group contributed by the particular carboxylic acid employed; and M is the metal catalyst selected from ruthenium, rhodium, palladium, osmium, iridium, and platinum.

The nitroaniline useful in the practice of this invention have the formula:

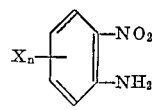

wherein X is selected from the class consisting of alkyl having up to four carbon atoms, alkoxy having up to four carbon atoms, chlorine and bromine; and wherein n is an integer from zero to two.

The nitroanilines in accordance with this novel procedure are reacted with compounds of the formula

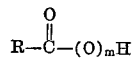

wherein m is an integer from zero to one, and wherein R is selected from the class consisting of hydrogen, alkyl having up to six carbon atoms, alkenyl having up to six carbon atoms, alkynyl having up to six carbon atoms, phenyl, furyl, pyrrole and thenyl, and the R groups containing the three substituents on carbon atoms selected from the class consisting of chlorine and bromine.

Suitable nitroanilines for the practice of this invention are o-nitroaniline, o-nitro-p-anisidine, o-nitro-p-toluidine, 2-nitro-4,5-dimethylaniline, 2-nitro-4-chloraniline, 2-nitro-4-bromoaniline and 2-nitro-4,5-dichloroaniline.

Suitable reactants with the said nitroanilines for the practice of the invention include the following: formaldehyde, p-chlorobenzaldehyde, veratraldehyde, isovaleraldehyde, acrolein, crotonaldehyde, propiolaldehyde, benzaldehyde, furfural, phenyl-acetaldehyde, pyrrole-2-aldehyde, propionaldehyde, thiophene-2-aldehyde, p-chlorobenzaldehyde, methylenedioxybenzaldehyde, benzoic acid, acetic acid, propionic acid, isobutyric acid, t-butyric acid, chloral, chloracetic acid, trichloracetic acid and cinnamaldehyde.

In general, the process of the invention is carried out by bringing the specified components together in the vapor phase at a temperature of 280–450° C., preferably 300–350° C. We have found that at higher temperatures, side reactions tend to set in, whilst the lower reaction temperature is governed mainly by the need to keep the often high-boiling point products in the vapor phase. In practice, the selected o-nitroaniline and the aldehyde or carboxylic acid reactant conveniently are fed separately or in admixture into a reactor and preferably are vaporized before passing to the catalyst bed. Thus, it is possible to feed reactants in liquid form directly onto the catalyst bed, however, in this instance the first or introductory portion or zone of the catalyst bed would then merely serve as a pre-heating zone for vaporizing the reactants.

The reaction involved in the process of the invention is exothermic and it is desirable to apply cooling to the catalyst bed. This may be achieved by operating the process in a tubular or multitubular reactor embodying the catalyst bed and equipped with a jacket filled with a suitable heat transfer medium such as a fused salt. Instead of employing a fixed catalyst bed, the process may be carried out in a reactor equipped with a fluidized catalyst bed, and also equipped with a heat exchanger arrangement to dissipate the heat of reaction.

Residence or contact time of the o-nitroaniline and aldehyde or carboxylic acid reactant with the catalyst bed is not particularly critical because the reaction products have a high degree of thermal stability, the time being governed largely by reaction temperature and by the type of reactor employed. We have found that when operating with a fixed bed of catalyst and at a jacket temperature of 300° C., an hourly liquid feed/catalyst ratio of unity is suitable, that is to say, one volume of liquid feed may be used per volume of catalyst per hour.

Recovery of the desired 2-substituted benzimidazole reaction product from the reactor may be effected by being condensed in conventional equipment and purified by, for example, crystallization. In many cases the reaction products are of a high state of purity, however, they may require washing with a solvent such as benzene to remove small amounts of by-product. When using a fixed bed reactor, we prefer a downward operation since this aids separation of the often high-melting reaction product from the catalyst bed. Under certain conditions using a carboxylic acid reactant, some of the o-nitroaniline feed may appear in the reaction product as the derived o-phenylene diamine. This may be separated from the benzimidazole portion of the reaction product by virtue of its lower boiling point and higher solubility in organic solvents, and recycled to the reaction. Similarly, any unchanged carboxylic acid may also be separated from the reaction product and recycled to the reaction.

The molar ratio of o-nitroaniline to aldehyde or carboxylic acid reactant normally is unity, but when one reactant is more available than the other, it may be advantageous to use an excess of the cheaper reactant. The amount of hydrogen used is usually in excess of the stoichiometric requirements and serves both to help vaporize the o-nitroaniline and aldehyde or carboxylic acid reactant and reaction products and to dissipate the heat of reaction. The excess of hydrogen is usually separated from the products and recirculated. Although pure hydrogen is preferred, inert diluents such as methane or nitrogen may be present without deleterious effect.

Nuclear substituted derivatives of o-nitroaniline, particularly those which result in 2-substituted benzimidazoles having a substituent in the 5- and/or 6-positions of the benzimidazole nucleus, may be employed as a reaction component in carrying out the process of the invention. Examples of such nuclear substituted derivatives are o-nitro-p-toluidine; o-nitro-p-anisidine; 2-nitro-4,5-dimethylaniline; and 2-nitro-4-chloroaniline.

The aldehyde reactant may be an aliphatic aldehyde (when R in Equation III is H or $C_nH_{2n+1}$) with a branched or unbranched carbon chain. Examples are formaldehyde, acetaldehyde, propionaldehyde, isovaleraldehyde and the like. Olefinic aldehydes may also be used, however, the double bond will be hydrogenated in the course of the reaction. The aldehyde may be an alicyclic aldehyde, for example thiophene-2-aldehyde; pyrrole-2-aldehyde; or furfural. Aromatic aldehydes such as benzaldehyde, and nuclear-substituted aldehydes, for example veratraldehyde, p-chlorobenzaldehyde, and 3,4-methylenedioxybenzaldehyde may also be used. Aryl substituted aliphatic aldehydes such as phenylacetaldehyde and substituted phenylacetaldehydes are also useful for the purpose of the invention.

Aldehydes, as such, normally are used in the process of the invention, however, precursors which form an aldehyde under thermal conditions or under thermal conditions and in the presence of a platinum-family metal catalyst, may be used, the aldehyde then being generated in situ. Thus, formaldehyde may be used in the form of a derivative such as 1-hydroxy-2-methylbutan-3-one, which decomposes thermally into formaldehyde and ethylmethyl ketone, the formaldehyde then being the reactant and the ethylmethyl ketone being inert. Similarly, alcohols which dehydrogenate readily in the presence of a platinum-family metal catalyst may also be used as the aldehyde reaction component.

The carboxylic acid reactant may be an aliphatic carboxylic acid with a branched or straight carbon chain. Examples are formic, acetic, propionic, isobutyric acids and the like. Olefinic acids may also be used, however, the double bond will be hydrogenated in the course of the reaction. The carboxylic acid can also be an aromatic carboxylic acid (such as benzoic acid) or nuclear-substituted derivatives of aromatic carboxylic acids (such as veratric acid, p-chlorobenzoic acid, and toluic acid). Aryl-substituted aliphatic carboxylic acids (such as phenylacetic acid) can be used also. In certain cases, heterocyclic carboxylic acids (such as pyridine carboxylic acids and thiophene carboxylic acids) can be used, however, there is a tendency for these carboxylic acids to be lost by thermal decarboxylation. Normally, the carboxylic acid reactant is used as such, however, simple derivatives such as the ester or amide can be so employed, especially ester or amides of the above-named carboxylic acids, since such derivatives function as a carboxylic acid precursor; moreover, such derivatives often have an enhanced thermal stability and thus serve as a useful source of the carboxylic acid reactant.

Although the catalyst metal employed in the catalyst bed is selected from ruthenium, rhodium, palladium, osmium, iridium and platinum, we prefer to use palladium, because of cost and comparative performance. Suitable carriers for the catalyst metal are particles or granules or pellets of alumina, zinc oxide, magnesia, silica, or other refractory oxides including naturally occurring materials such as bauxite, kieselguhr, and activated clays, or granulated carbon, silica gel, brickdust, and like inert materials.

Example 1

An equimolar mixture of o-nitroaniline and benzaldehyde was fed at a rate of 10 ml. per hour over a bed of a palladium (0.1% w./w.) on fuller's earth (10 ml.) in a tubular reactor (¼ inch internal diameter) held in a bath of fused potassium nitrate/sodium nitrite at 300–320° C. Hydrogen was simultaneously fed into the reactor at a rate of 5–10 liters per hour. The effluent from the reactor was cooled and deposited colorless crystals of 2-phenylbenzimidazole, M.P. 299° C., with infra-red spectrum identical with an authentic sample. The yield of 2-phenylbenzimidazole was 76.5% of the theoretical.

Example 2

Example 1 was repeated using similar feed and conditions but with palladium (0.1% w./w.) in ⅛ inch pellets of γ alumina as catalyst. The yield of 2-phenylbenzimidazole was 72%.

Example 3

Example 1 was repeated under similar conditions with a catalyst of platinum (1% w./w.) on γ alumina pellets. 2-phenylbenzimidazole was obtained in 40% yield.

Example 4

Example 1 was repeated using an equimolar mixture of o-nitroaniline and furfural as feed, other conditions being similar. 2-furylbenzimidazole, M.P. 295° C. was obtained in 45% yield.

Example 5

A solution of o-nitroaniline in a 3-molar excess of chloral was passed as in Example 1 over a bed of platinum (1% w./w.) on alumina pellets at a bath temperature of 400° C. 2-methylbenzimidazole hydrochloride was formed in the cool outlet of the reactor. After basification, this yielded 2-methylbenzimidazole, M.P. 173° C., identical with an authentic specimen.

Example 6

Example 5 was repeated using as feed a solution of o-nitroaniline in 1-hydroxy-2-methylbutan-3-one (3 molar excess). Benzimidazole, M.P. 168–170° C. was formed and identified by elemental analysis and infra-red spectrum.

The process of the invention, employing a carboxylic acid reactant, is illustrated by the following non-limitative practical examples:

Example 7

An equimolar mixture of o-nitroaniline and benzoic acid was vaporized and fed at a rate of 10 ml./hr. over a bed of palladium (0.1% w./w.) on alumina pellets (10 ml.) in a tubular reactor (¼ inch internal diameter) held in a bath of fused potassium nitrate/sodium nitrite at 325° C. Hydrogen was fed simultaneously at a rate of 5–10 liters per hour. The effluent from the reactor was cooled giving a mixture of 2-phenylbenzimidazole (48.5%) and o-phenylene diamine (37.5%) together with some unchanged benzoic acid (17%).

Crude o-phenylene diamine isolated from the reaction product by benzene washing, followed by removal of solvent, was mixed with an equimolar amount of benzoic acid and the mixture was passed over a bed of palladium (0.1% w./w.) on fuller's earth catalyst. A yield of 2-phenylbenzimidazole of 35% was obtained.

Example 8

The first-described procedure of Example 7 was repeated with a mixture of acetic acid (2 moles) and o-nitroaniline (1 mole) as feed and with a bed of palladium (0.1% w./w.) on fuller's earth as catalyst. The yield of 2-methylbenzimidazole was 61.5%.

Example 9

The procedure of Example 8 was repeated with formic acid in place of the acetic acid. The yield of benzimidazole was 37%, whilst 40% of the o-nitroaniline feed was recovered as o-phenylene diamine.

The selectivity of the platinum family of metals in carrying out the catalytic hydrogenation process of the invention was demonstrated by repeating Example 1, except that a nickel-on-kieselguhr catalyst (70% Ni) was used at a bath temperature of 250–400° C. Extensive degradation of the feed occurred giving ammonia and other breakdown products. No 2-phenylbenzimidazole could be detected. The selectivity was again demonstrated by repeating Examples 1 to 4 except that a mixed chromium/molybdenum catalyst was employed at 300–350° C. o-Nitroaniline was recovered from the effluent gases and no 2-phenylbenzimidazole could be detected. The selectivity of the platinum family of metals in carrying out the catalytic hydrogenation process of the invention was further demonstrated by repeating Example 7, except that a nickel-on-kieselguhr catalyst (70% Ni) was used at a bath temperature of 350–400° C. Extensive degradation of the feed occurred giving ammonia and other breakdown products. No 2-phenylbenzimidazole could be detected. The selectivity was again demonstrated by repeating Examples 7 to 9 except that a mixed chromium/molybdenum catalyst was employed at 300–350° C. No. 2-phenylbenzimidazole could be detected.

When employing an aldehyde reactant, we believe that a first stage of the reaction consists in a condensation of the o-nitroaniline component with the aldehyde component to give a Schiff's base, as illustrated in the following equation:

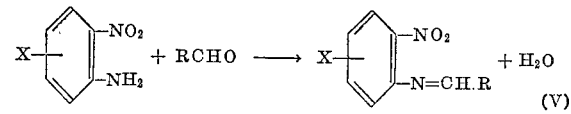

(V)

wherein X and R are as hereinbefore defined. Accordingly, this aspect of the process of the invention contemplates a process in which the Schiff's base (which may be first formed by conventional means) is reacted with hydrogen over the catalyst bed as hereinbefore described, whereby 2-substituted benzimidazoles are formed. In accordance with yet a further embodiment of this aspect of the process of the invention, the o-nitroaniline and aldehyde components are first reacted in a pre-heating zone in a reactor packed with a material such as alumina, so that the Schiff's base is formed before passage over the hydrogenation catalyst, in order to prevent loss of aldehyde by hydrogenation.

What is claimed is:

1. A process of producing a 2-substituted benzimidazole which comprises reacting a nitroaniline of the formula

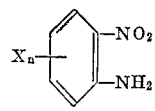

wherein X is selected from the class consisting of alkyl of not more than four carbon atoms, alkoxy of not more than four carbon atoms, chlorine and bromine; and wherein $n$ is an integer from zero to two; and a compound of the formula

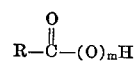

wherein $m$ is an integer from zero to one and wherein R is selected from the class consisting of hydrogen, alkyl of not more than six carbon atoms, alkenyl of not more than six carbon atoms, alkynyl of not more than six carbon atoms, phenyl, furyl, pyrrole, thenyl and R containing up to three substituents on carbon atoms selected from the class consisting of chlorine and bromine; in vapor phase with hydrogen in the presence of a metal catalyst of the class consisting of ruthenium, rhodium, palladium, osmium, iridium and platinum at a temperature within the range of about 280° C. to about 450° C.

2. A process of producing a 2-alkylbenzimidazole which comprises reacting o-nitroaniline with an aldehyde of not more than seven carbon atoms and hydrogen in contact with a metallic palladium catalyst on an inert carrier at a temperature between about 280° C. and about 450° C.

3. A process of producing 2-phenylbenzimidazole which comprises reacting o-nitroaniline with benzaldehyde by contacting the mixture with metallic palladium on an inert carrier in the presence of hydrogen at a temperature between about 300° C. and about 350° C.

4. A process of producing a 2-alkylbenzimidazole which comprises reacting o-nitroaniline with a carboxylic acid of not more than seven carbon atoms and hydrogen in contact with a metallic palladium on an inert carrier at a temperature between about 280° C. and about 450° C.

5. A process of producing 2-methylbenzimidazole which comprises reacting o-nitroaniline with acetic acid by contacting the reaction mixture with metallic palladium on an inert carrier in the presence of hydrogen at a temperature between about 300° C. and about 350° C.

6. A process of producing 2-furfurylbenzimidazole which comprises heating a mixture of furfural, o-nitroaniline and hydrogen at a temperature between about 280° C. and about 450° C. in the presence of metallic palladium on an inert carrier.

7. A process of producing 2-phenylbenzimidazole which comprises heating a mixture of benzoic acid, o-nitroaniline and hydrogen at a temperature between about 280° C. and about 450° C. in the presence of metallic palladium on an inert carrier.

8. A process of producing benzimidazole which comprises heating a mixture of formic acid, o-nitroaniline and hydrogen at a temperature between about 280° C. and about 450° C. in the presence of metallic palladium on an inert carrier.

References Cited

UNITED STATES PATENTS

| 2,522,854 | 9/1950 | Brink et al. | 260—309.2 |
| 2,689,853 | 9/1954 | Schenck et al. | 260—309.2 |
| 2,933,503 | 4/1960 | Clarke et al. | 260—309.2 |

FOREIGN PATENTS 713,133   8/1954   Great Britain.

OTHER REFERENCES

Adams et al.: Jour. Amer. Chem. Soc. vol. 70, p. 2673 (1948).

Kurilo et al.: Chem. Abst. vol. 40, cols. 5714–5 (1946).

Wright Chem. Rev. col. 48, pp. 434–9, 458–61 and 464 (1951).

HENRY R. JILES, *Primary Examiner.*

N. TROUSOF, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,406,187                    October 15, 1968

Wolf Rainer Kroll

It is certified that error appears in the above identified patent and that said Letters Patent are hereby corrected as shown below:

Column 4, line 50, "Particularly," should read -- Particularly --. Column 5, lines 19 and 20, the right-hand portion of the formula should appear as shown below:

$$NaN_3 \cdot 1.8Al(C_2H_5)_3 + 0.3Al(C_2H_5)_3$$

Column 10, line 75, "acetlyene" should read -- acetylene --.
Column 13, line 15, "by a temperature" should read -- at a temperature --.

Signed and sealed this 10th day of March 1970.

(SEAL)
Attest:

Edward M. Fletcher, Jr.               WILLIAM E. SCHUYLER, JR.
Attesting Officer                      Commissioner of Patents